US006314809B1

(12) United States Patent
Kasevich et al.

(10) Patent No.: US 6,314,809 B1
(45) Date of Patent: Nov. 13, 2001

(54) GRAVITY MEASUREMENT USING BOSE-EINSTEIN CONDENSED VAPORS AND ATOM INTERFEROMETRY

(75) Inventors: Mark A. Kasevich, Madison, CT (US); Brian P. Anderson, Boulder, CO (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 09/439,003

(22) Filed: Nov. 12, 1999

Related U.S. Application Data

(60) Provisional application No. 60/108,191, filed on Nov. 12, 1998.

(51) Int. Cl.[7] .................................................. G01V 7/04
(52) U.S. Cl. ............................................................ 73/382 R
(58) Field of Search ............................. 73/382 R, 382 G, 73/862.59; 250/580

(56) References Cited

U.S. PATENT DOCUMENTS 3,761,721 * 9/1973 Altshuler et al. ..................... 250/580
4,874,942 * 10/1989 Clauser .............................. 73/382 G

OTHER PUBLICATIONS

"Output Coupler for Bose–Einstein Condensed Atoms" Mewes et al., Phys. Rev. Letters, V78, No. 4, Jan. 27, 1997, pp. 582–585.

"Bloch Oscillations of Atoms in an Optical Potential", BenDahan et al., Phys. Rev. Letters, V76, No. 24, Jun. 10, 1996 pp. 4508–4511.

"Observation of Interference Between Two Bose Condensates", Andrews et al., Science, V275, Jan. 31, 1997, pp. 637–641.

"Observation of Bose–Einstein Condensation in a Dilute Atomic Vapor", Anderson et al., Science, V269, Jul. 14, 1995, pp. 198–201.

* cited by examiner

Primary Examiner—John E. Chapman
(74) Attorney, Agent, or Firm—Ohlandt, Greeley, Ruggiero & Perle, L.L.P.

(57) ABSTRACT

The invention uses coherent outputs from two or more Bose-Einstein condensates (BECs) to characterize the acceleration due to gravity. The condensates are created at two or more different heights in the gravitational potential. de Broglie waves are extracted from each of these condensates and are interfered at detector which is located below the lower condensate. In the same manner as an optical heterodyne experiment, interference of the two "atom laser beams" results in a beatnote whose frequency is given by the energy difference associated with each atom laser beam. This beat frequency is given by the frequency difference of the two atom laser beams and is proportional (via Planck's constant) to the energy difference of the interfering beams. This energy difference allows the force of gravity to be derived at a level of sensitivity approaching $10^{-14}$ g (where g is the acceleration due to gravity).

8 Claims, 3 Drawing Sheets

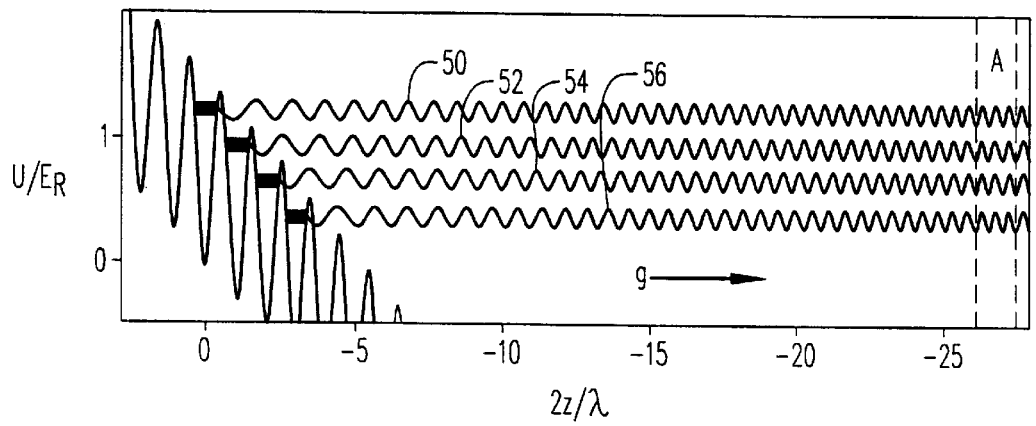
FIG. 3
FIG. 4A
FIG. 4B
FIG. 4C
FIG. 4D
FIG. 4E
FIG. 4F
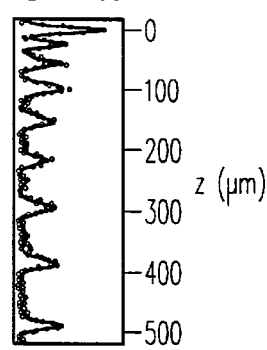

ly, to a method
GRAVITY MEASUREMENT USING BOSE-EINSTEIN CONDENSED VAPORS AND ATOM INTERFEROMETRY This Application claims priority from Provisional Application Ser. No. 60/108,191, filed Nov. 12, 1998.

FIELD OF THE INVENTION

This invention relates to measurement of the force of gravity and other forces and, more particularly, to a method of gravity measurement using Bose-Einstein condensed vapors and atom interferometry.

BACKGROUND OF THE INVENTION

In 1995, Anderson et al. in "Observation of Bose-Einstein Condensation in Dilute Atomic Vapor", Science, Vol. 269, Jul. 14, 1995, pp.198–201, demonstrated that a dilute vapor of $^{87}$Rb could be cooled to the temperature required for observation of Bose-Einstein condensation. Bose-Einstein condensation (BEC) occurs when noninteracting bosonic atoms, below a certain temperature, suddenly develop a macroscopic population in the lowest energy quantum mechanical state of an external confining potential. In such state, the de Broglie wavelength (i.e., Planck's constant divided by the product of mass and the velocity of the speed of light) associated with an atomic wave packet becomes comparable with or larger than the spacing between particles in the gas.

Atoms in this state have coherence properties which are similar to those of optical lasers. Wolfgang Ketterle's group at MIT (i.e., see "Observation of Interference Between Two Bose Condensates", Andrews et al., Science, Vol. 275, Jan. 31, 1997, pp. 637–641), reported observation of interference from two independent Bose condensates. Ketterle's group produced two independent condensates and released the condensates from traps used to create two expanding clouds of atoms—one cloud from one condensate, the other cloud from the other condensate—which eventually overlapped. By taking a picture of the atoms in the overlap region, they observed interference fringes which they interpreted as interference of de Broglie waves originating with each of the two condensates. This was the first demonstration of the phase coherence properties of a BEC and indicated that the output of each condensate was essentially a coherent beam of atoms.

Currently, a number of methods are used to measure the force of gravity and other weak forces. Especially in geological exploration, there exists a need for more highly accurate gravity measurements to provide indications of buried mineral and oil deposits.

Accordingly, it is an object of this invention to provide an improved method for the measurement of weak forces.

It is another object of this invention to provide a method for the measurement of the force of gravity that manifests atomic level measurement accuracies.

SUMMARY OF THE INVENTION

The invention uses coherent outputs from two or more Bose-Einstein condensates (BECs) to characterize the acceleration due to gravity. The condensates are created at two or more different heights in the gravitational potential. de Broglie waves are extracted from each of these condensates and are interfered at a detector which is located below the lower condensate. In the same manner as an optical heterodyne experiment, interference of the two "atom laser beams" results in a beatnote whose frequency is given by the energy difference associated with each atom laser beam. This beat frequency is given by the frequency difference of the two atom laser beams and is proportional (via Planck's constant) to the energy difference of the interfering beams. This energy difference allows the force of gravity to be derived at a level of sensitivity approaching $10^{-14}$ g (where g is the acceleration due to gravity).

BRIEF DESCRIPTION OF THE DRAWINGS

FIG. 3 illustrates the effective optical plus gravitational potential $U/E_R$ for parameters used in experiments. ($E_R=\hbar^2k^2/2$ m is the photon recoil energy with $k=2\pi/\lambda$, with $\lambda$ being the wavelength of the laser used to create the periodic potential). The horizontal oscillating curves illustrate de Broglie waves from the tunnel output of each well. In region A, the relative phases of the waves interfere constructively to form a pulse. Heavy lines illustrate the energies of the lowest bound states of harmonic oscillator potentials that match the shapes of the actual potentials near each local energy minimum.

FIG. 4A illustrates the absorption image of a Bose-Einstein condensate in a magnetic, time-averaged orbiting potential (TOP) trap.

FIGS. 4B–4E illustrate absorption images after fixed holding times in the optical lattice showing the time development of the pulse train, (B) 3 ms; (C) 5 ms; (D) 7 ms; and (E) 10 ms. Because the imaging process was destructive, a new condensate was created for each of the images. Pulses at the lower portion of the image were emitted at earlier times. In images (B)–(E), the uppermost spot is an image of the lattice array, which overlaps with the last emitted pulse.

FIG. 4F is an integrated absorption profile obtained by summing over the horizontal cross-sections. The solid curve shows a non-linear least squares fit to a series of Gaussian pulses constrained to be separated by a fixed time interval.

DETAILED DESCRIPTION OF THE INVENTION

Figure 1:
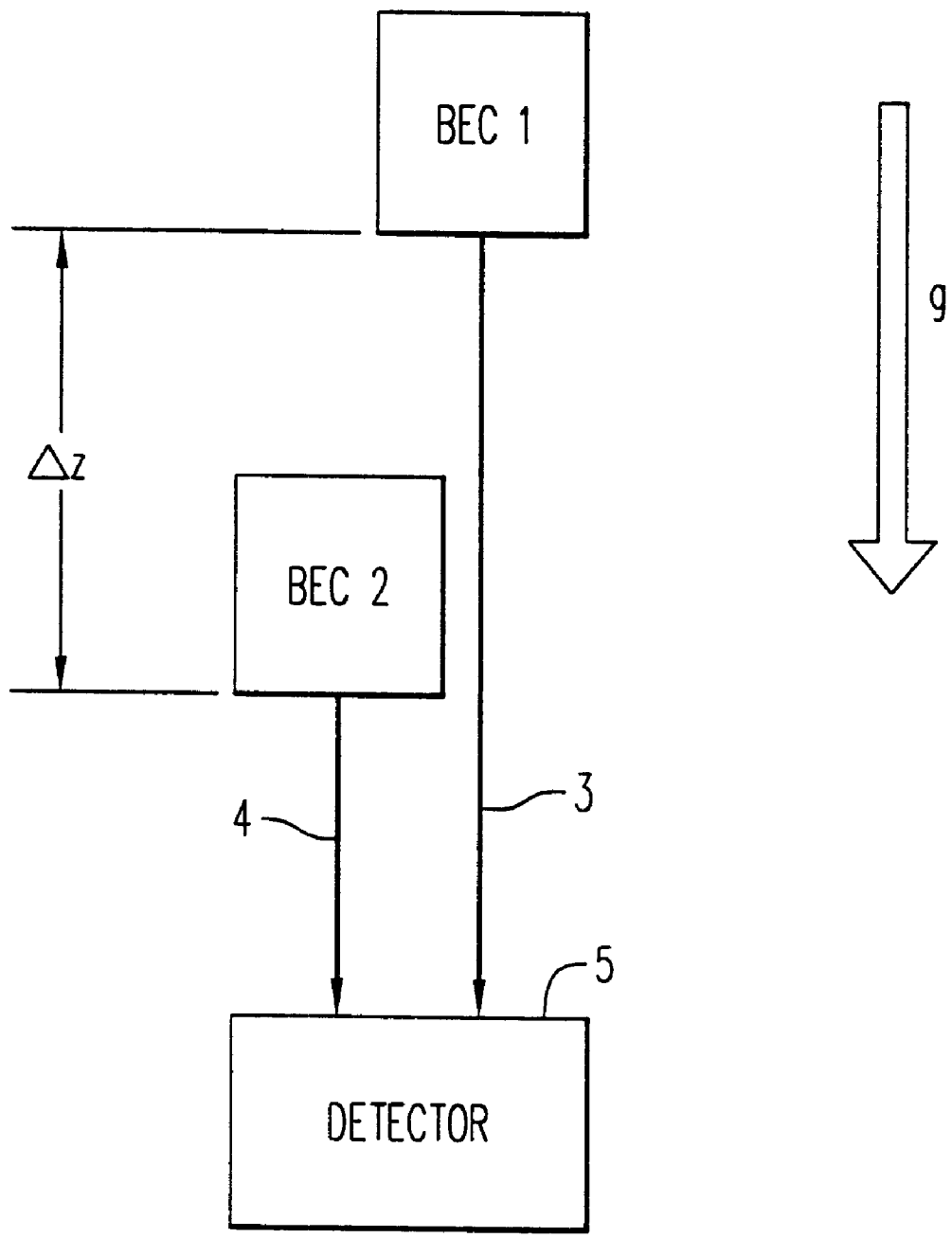
FIG. 1 schematically illustrates the method of the invention.

Referring to FIG. 1, two BEC sources BEC1 and BEC2 are created at two different heights in gravitational potential g. de Broglie waves 3 and 4 are extracted from each of these condensates and are interfered at a spatially localized detector 5 which is located below BEC2. Interference of atom "laser beams" 3 and 4 at detector 5 results in a beatnote whose frequency is given by the energy difference between atom laser beams 3 and 4. This beat frequency is given by the frequency difference of atom laser beams 3 and 4 and is proportional (via Planck's constant $\hbar$) to the energy difference of beams 3 and 4, (i.e. $\hbar\omega_j=mg\Delta z$, where $\hbar$ Planck's constant, $\omega_j$=the observed beat frequency between the two atom laser beams, m=the atomic mass of the atoms, g=the acceleration due to gravity and $\Delta z$=the vertical distance between traps). This energy difference allows the force of gravity to be derived at a level of sensitivity approaching $10^{-14}$ g. The invention can also be used to measure other forces which can affect the beams of atoms.

Figure 2:
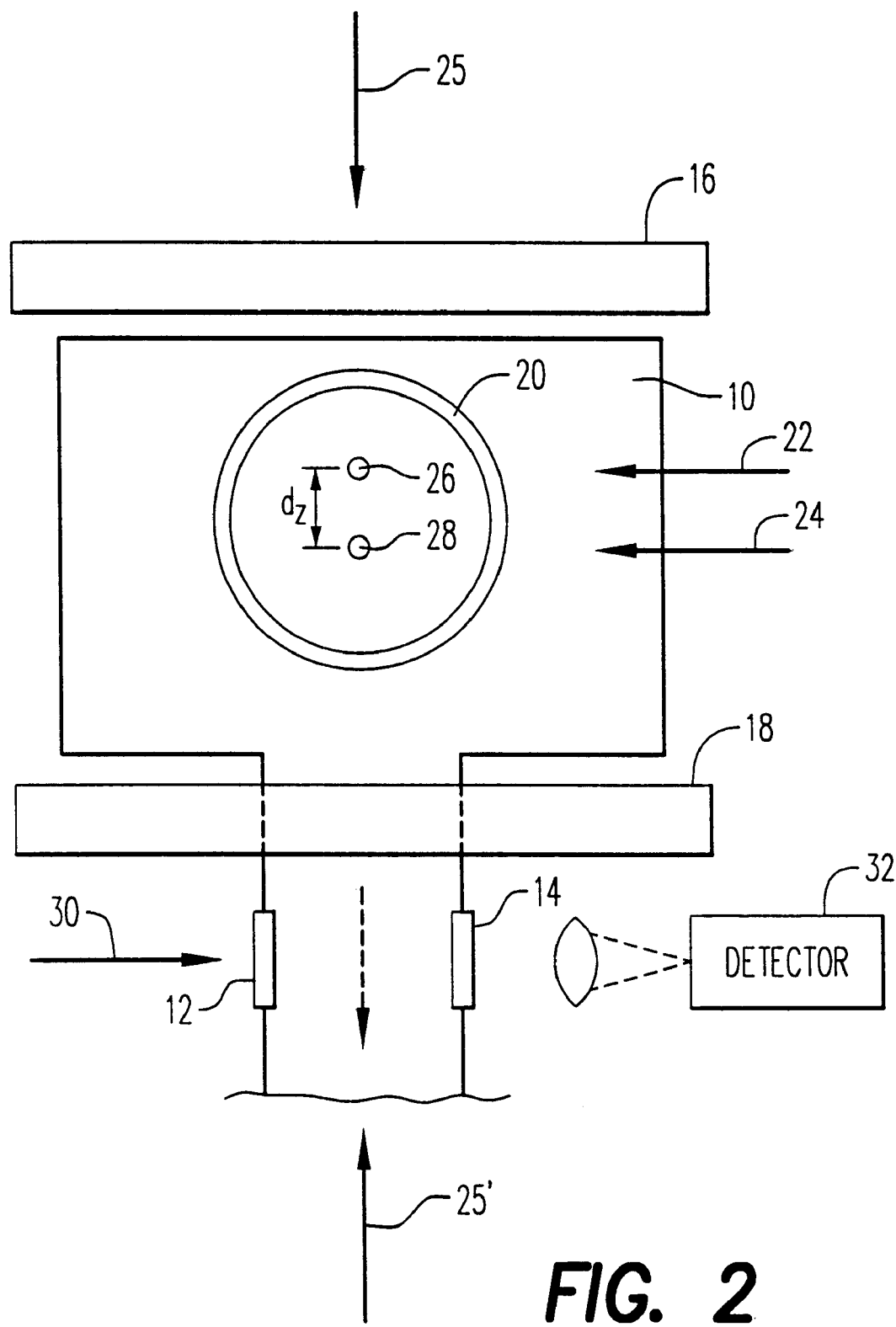
FIG. 2 is a schematic illustration of apparatus used to carry out the invention.

FIG. 2 schematically illustrates the apparatus used to perform the method of the invention. An ultra high vacuum chamber 10 allows optical access through optical viewports 12 and 14 (more are present but not shown). Quadrupole field coils 16 and 18 provide a magnetic trap and are shown above and below vacuum chamber 10. Four coils 20 (only one is schematically shown), are used to form the rotating field for the TOP trap and are positioned just outside vacuum chamber 10. Multiple optical laser beams (not shown) are used to initially cool and trap the atoms within vacuum chamber 10. Among others, a pair of BECs 26 and 28, separated by a distance $\Delta z$, are created at the center of vacuum chamber 10 in traps created by tightly focussed laser beams 22 and 24.

Optionally, a lattice or "chain" of optical traps may be created (to replace BECs 26 and 28). The traps are anti-nodes of optical standing waves created by vertically oriented and opposed laser beams 25 and 25'. The optical fields created by laser beams 22 and 24 (or 25 and 25') induce dipole moments in the atoms and, thus, create an energy shift, or force, which tends to trap the atoms. A tunneling action enables the atoms to slowly leak from the energy traps.

To image the spatial and temporal distribution of the atoms, a resonant, collimated laser beam 30 is aligned through window 12 in the optical detector portion of chamber 10 and is incident on the atoms that fall therethrough under influence of the force of gravity. The atoms absorb light from beam 30, leaving a shadow in the resulting probe beam intensity profile. This shadow is imaged onto a photodetector 32. The absorption profile of the resulting signal is used to infer the atomic density profile.

Rather than creating just two condensates, the above indicated chain of vertically separated condensates (created by laser beams 25, 25') can be used and the atoms allowed to leak out from each one of these condensate traps and interfere in a detection region located below the $N^{th}$ condensate (as is the case for the experimental data presented below). If the spacing between the condensate traps is $\Delta z$, then, via the Josephson relation ($\hbar \omega_J = mg\Delta z$), the interference from these traps is expected to be periodic. The frequency $\omega_J$ equals mass times acceleration due to gravity times height difference $\Delta z$ divided by Planck's constant $\hbar$.

In FIG. 3, horizontal oscillating curves 50–56 illustrate de Broglie waves from the tunnel output of each trap. In region A (residing in the optical detector portion of chamber 10), the relative phases of the waves interfere constructively to form a pulse. The quantum dynamics of this system are analogous to the ac Josephson effect which is observed in superconducting electronic systems.

In the ac Josephson effect, two superconducting reservoirs are connected via a thin tunnel junction. The application of a voltage across this junction results in an ac current at the frequency given by the energy difference between these two reservoirs. In the system of FIG. 2, this energy difference is determined by the gravitational potential rather than by an externally applied voltage.

More specifically, interference of atomic de Broglie waves tunneling from a vertical array of macroscopically populated traps was observed. The traps were located in the anti-nodes of an optical standing wave initially loaded from a single BEC. Tunneling was induced by acceleration due to gravity, and interference was observed as a train of falling pulses of atoms. In the limit of weak atomic interactions, the pulse frequency is determined by the gravitational potential energy difference between adjacent potential wells.

As indicated above, interference occurs between macroscopic quantum states comprised of BEC atoms confined in an array of optical traps in a gravitational field. Neglecting atomic interactions, the potential difference between adjacent traps is determined by the gravitational potential $U_G = mg\Delta z$, which is analogous to the applied voltage in the ac Josephson effect. The traps are formed at the anti-nodes of a vertically oriented optical standing wave.

For appropriate experimental parameters, each lattice state can have a potentially significant tunneling probability into an (unbound) continuum, and can be modeled as a point emitter of de Broglie waves, with an emission rate proportional to the tunneling probability. The output from an array of such emitters localized at positions is obtained by summing over the coherent emission from each well.

FIGS. 4A–4F illustrate the interference resulting from this configuration. These are images of the atomic density distribution. FIG. 4A shows a BEC just before it has been loaded into the optical lattice trap. FIGS. 4B–4E show pictures of the atoms after various holding times in the optical lattice. For example, FIG. 4B shows the distribution three milliseconds after loading into the lattice, and FIG. 4E illustrates the distribution after holding for 10 milliseconds in the lattice. The vertical scale of 500 microns across the entire field is much larger than the size of the initial BEC which is about 10 microns. It is also larger, than the 500 nanometer separation between adjacent lattice traps. The resolution of the imaging system was not sufficient to view each individual condensate.

These pictures show that the atoms confined in this lattice were behaving as a leaky "water faucet" producing a stream of drops of atoms. The time separation between adjacent drops is determined from analyzing the spatial profiles. The observed time of 1.1 milliseconds is in excellent agreement with the calculated frequency given by the spatial separation of adjacent traps.

This measured frequency can be used to determine g the acceleration due to gravity, by substituting for the known values of atomic mass, the wavelength of the laser light, and Planck's constant.

Experimental Data

In the experimental approach, laser cooled and trapped atoms were loaded into a magnetic trap and evaporatively cooled to temperatures below the Bose-Einstein condensation threshold. After condensing, atoms were transferred into the optical lattice and the magnetic trap was turned off. By adjusting the depth of the optical wells, the tunneling rate from the wells could be controlled so that it was fast enough to observe atoms leaving the traps, but slow enough to allow for direct observation of many periods of the temporally modulated signal described above before the traps were depleted.

Atoms were loaded into a magneto-optic trap from a dilute $^{87}$Rb vapor using established laser cooling and trapping techniques. After a 200 sec. loading interval, atoms were transferred into a magnetic time-averaged orbiting potential (TOP) trap, and were subsequently evaporatively cooled by slowly reducing the trap depth and increasing the trap spring constants. A final rf-induced evaporation stage was used to cool the atoms to condensation. Typically, condensates of $10^4$ atoms were created after 30 sec. of evaporative cooling.

Following the phase transition, the magnetic trap spring constants were adiabatically reduced by a factor of 400 to 1000, enabling variation of both the size and density of the condensate.

The optical lattice traps were created by a standing wave of light (whose wavelength $\lambda = 2\pi/k = 850$ nm) was far-detuned from the 780 nm Rb cooling and trapping transitions. The well depths, which scale linearly with the intensity of the beam, could be controlled electronically with an acousto-optic modulator. Atoms were transferred into the optical lattice from the magnetic trap by ramping up the intensity of the laser field while holding atoms in a weak magnetic trap. Following this ramp, the magnetic quadrupole field was suddenly turned off. (The rotating magnetic field was left on to maintain the spin polarization of the sample.) The number of traps loaded (and the number of atoms in each trap) depended on the initial spatial extent of the condensate.

The lifetime of the atoms confined in the lattice potential was measured by recording images after various holding times. For a 2.1 $E_R$ deep lattice, the observed lifetime was 50 ms. Faster tunneling rates were obtained by operating at a reduced optical intensity. Although these higher rates led to rapid depletion of the traps, they allowed for direct observation of the tunnel array output. This output is shown in FIGS. 4B–4E for a well depth of 1.4 $E_R$.

A train of pulses was observed. The pulse period obtained from the measured spatial separation of the pulses was 1.10±0.05 ms, in good agreement with the expected value of 1.09 ms for g=9.8 m/s$^2$. Each pulse contained about 10$^3$ atoms. This corresponds to phase space densities per pulse which are well above the condition for quantum degeneracy. The tunneling rate could be increased by lowering the well depths, producing fewer pulses with more atoms per pulse. For example, well depths of 1.0 $E_R$ produced a train of 4 pulses before the initially trapped population was depleted.

The tunnel array output can be viewed as an atom laser whose coherence length (>500 um) greatly exceeds the dimensions of the resonator. The time-domain pulses are directly analogous to the output of a mode-locked laser source, in which interference occurs between many properly phased continuous wave output beams. The nearly constant time interval between successive pulses directly implies that the relative phase associated with each pulse envelope is well defined.

The potential sensitivity associated with the above described method can be readily calculated. Assume two condensates are separated vertically by one centimeter. Then, the acceleration of just 10$^{-14}$ g results in a phase shift of one radian for the resulting beat note after a one hundred second observation interval. If 100 million atoms are detected over the course of this hundred second observation, then a shot noise limited interference signal results in an ability to resolve an acceleration as small 10$^{-14}$ g. By comparison, the best commercial accelerometers, i.e., superconducting instruments, perform at the 10$^{-11}$ g per root Hz level, and atom interferometer accelerometers are expected to perform at the 10$^{-10}$ g per root Hz level. This invention results in a 3 order of magnitude improvement over the current state-of-the-art.

It should be understood that the foregoing description is only illustrative of the invention. Various alternatives and modifications can be devised by those skilled in the art without departing from the invention. For example, while rubidium has been discussed as the atomic species other species may be used such as : Lithium, Cesium, Sodium and Hydrogen. Accordingly, the present invention is intended to embrace all such alternatives, modifications and variances which fall within the scope of the appended claims.

What is claimed is:

1. A method for determining a force, comprising the steps of:
   a) loading a pair or more of Bose-Einstein condensates (BECs) of atoms into first and second optical traps, said first and second optical traps separated by a distance $\Delta z$;
   b) passing streams of said atoms that leak out of said first and second optical traps under influence of said force, through an observation region in such a manner that interference can be detected between said streams; and
   c) examining said interference in said observation regions to enable a parameter to be determined relating to said force.

2. The method as recited in claim 1, wherein said force is gravity.

3. The method as recited in claim 2, wherein step c) examines an interference pattern created by said streams of atoms to determine the force of gravity through use of the following expression:

$$\hbar \dot{\omega}_J = mg\Delta z$$

where: $\hbar$=Planck's constant,
$\dot{\omega}_J$=the observed beat frequency between two of said streams of atoms,
m=the atomic mass of the atoms,
g=the acceleration due to gravity and
$\Delta z$=the vertical distance between traps.

4. The method as recited in claim 1, wherein said atoms comprise at least one selected from the group consisting of Rubidium, Lithium, Sodium, Cesium and Hydrogen.

5. Apparatus for determining a force, comprising:
   means for creating at a pair or more of Bose-Einstein condensates (BECs) of atoms into first and second optical traps, said first and second optical traps separated by a distance $\Delta z$;
   means for observing streams of said atoms that leak out of said first and second optical traps under influence of said force, in such a manner that interference can be detected between said streams; and
   means for examining said interference in said observation region to enable a parameter to be determined relating to said force.

6. The apparatus as recited in claim 5, wherein said force is gravity.

7. The apparatus as recited in claim 6, wherein said means for examining examines an interference pattern created by said streams of atoms to determine the force of gravity through use of the following expression:

$$\hbar \dot{\omega}_J = mg\Delta z$$

where: $\hbar$=Planck's constant,
$\dot{\omega}_J$=the observed beat frequency between two of said streams of atoms,
m=the atomic mass of the atoms,
g=the acceleration due to gravity and
$\Delta z$=the vertical distance between traps.

8. The apparatus as recited in claim 5, wherein said atoms comprise at least one selected from the group consisting of Rubidium, Lithium, Sodium, Cesium and Hydrogen.

* * * * *